United States Patent
Thibault et al.

(10) Patent No.: US 8,416,914 B2
(45) Date of Patent: Apr. 9, 2013

(54) SYSTEM AND METHOD OF ITERATIVE IMAGE RECONSTRUCTION FOR COMPUTED TOMOGRAPHY

(75) Inventors: Jean-Baptiste Thibault, Milwaukee, WI (US); Zhou Yu, Waukesha, WI (US); Jiao Wang, South Bend, IN (US); Ken David Sauer, South Bend, IN (US); Charles Addison Bouman, Jr., West Lafayette, IN (US)

(73) Assignees: General Electric Company, Schenectady, NY (US); Purdue Research Foundation, West Lafayette, IN (US); University of Notre Dame du Lac, Notre Dame, IN (US)

( * ) Notice: Subject to any disclaimer, the term of this patent is extended or adjusted under 35 U.S.C. 154(b) by 136 days.

(21) Appl. No.: 13/178,712

(22) Filed: Jul. 8, 2011

(65) Prior Publication Data
US 2013/0010917 A1    Jan. 10, 2013

(51) Int. Cl.
*A61B 6/00* (2006.01)

(52) U.S. Cl.
USPC ............................................. 378/4; 382/131

(58) Field of Classification Search ....... 378/4; 382/131
See application file for complete search history.

(56) References Cited

U.S. PATENT DOCUMENTS

| | | | | |
|---|---|---|---|---|
| 5,070,455 A | * | 12/1991 | Singer et al. | 378/6 |
| 6,507,633 B1 | * | 1/2003 | Elbakri et al. | 378/8 |
| 6,754,298 B2 | * | 6/2004 | Fessler | 378/4 |
| 7,251,306 B2 | * | 7/2007 | Sauer et al. | 378/4 |
| 7,272,205 B2 | * | 9/2007 | Thibault et al. | 378/4 |
| 7,308,071 B2 | * | 12/2007 | Bouman et al. | 378/4 |
| 7,379,062 B2 | * | 5/2008 | Poole | 345/424 |
| 7,672,424 B2 | * | 3/2010 | Ziegler et al. | 378/19 |
| 8,218,715 B2 | * | 7/2012 | Sauer et al. | 378/4 |

OTHER PUBLICATIONS

Thibault et al., "A three-dimensional statistical approach to improved image quality for multislice helical CT," Med. Phys., vol. 34, No. 11, pp. 4526-4544, 2007.
Geman et al., "Stochastic Relaxation, Gibbs Distributions, and the Bayesian Restoration of Images," IEEE Transactions on Pattern Analysis and Machine Intelligence, vol. PAMI-6, No. 6, pp. 721-741, Nov. 1984.
Bouman et al., "A Generalized Gaussian Image Model for Edge-Preserving MAP Estimation," IEEE Trans. on Image Processing, vol. 2, No. 3, pp. 296-310, Jul. 1993.
Geman et al., "Markov Random Field Image Models and Their Applications to Computer Vision," Proceedings of the International Congress of Mathematicians, pp. 1496-1517, Berkeley, CA, 1986.
Lakshmanan et al., "Valid Parameter Space for 2-D Gaussian Markov Random Fields," IEEE Transactions on Information Theory, vol. 39, No. 2, pp. 703-709, Mar. 1993.

(Continued)

*Primary Examiner* — Alexander H Taningco
(74) *Attorney, Agent, or Firm* — Ziolkowski Patent Solutions Group, SC

(57) ABSTRACT

A non-transitory computer readable storage medium having stored thereon a computer program having instructions, which, when executed by a computer, cause the computer to acquire a set of projection data corresponding to a plurality of image voxels and to calculate coefficients of a regularizing function configured to penalize differences between pairs of the plurality of voxels that are not immediate neighbors. The instructions also cause the computer to iteratively reconstruct an image from the set of projection data based on the regularizing function.

25 Claims, 4 Drawing Sheets

OTHER PUBLICATIONS

Wang et al, "Spectral Design in Markov Random Fields," Proc. 30th Int'l Wkshp. on Bayesian Inf. and Max. Entropy Methods in Sci. and Engr., pp. 451-458, Chamonix, France, Jul. 4-9, 2010.

Yu et al., "Fast Model-Based X-Ray CT Reconstruction Using Spatially Nonhomogeneous ICD Optimization," IEEE Transactions on Image Processing, vol. 20, No. 1, pp. 161-175, Jan. 2011.

Borman et al., "Nonlinear Prediction Methods for Estimation of Clique Weighing Parameters in NonGaussian Image Models," Proc. of SPIE Conf. on Bayesian Inference for Inverse Problems, vol. 3459, pp. 369-377, San Diego, CA, Jul. 23-24, 1998.

Luettgen et al., "Efficient Multiscale Regularization with Applications to the Computation of Optical Flow," IEEE Transactions on Image Processing, vol. 3, No. 1, pp. 41-64, Jan. 1994.

Frese et al., "Adaptive Wavelet Graph Model for Bayesian Tomographic Reconstruction," IEEE Transactions on Image Processing, vol. 11, No. 7, pp. 756-770, Jul. 2002.

Buades et al., "A non-local algorithm for image denoising," IEEE Computer Vision and Pattern Recognition 2005, vol. 2, pp. 60-65, 2005.

\* cited by examiner

SYSTEM AND METHOD OF ITERATIVE IMAGE RECONSTRUCTION FOR COMPUTED TOMOGRAPHY

BACKGROUND OF THE INVENTION

Embodiments of the invention relate generally to diagnostic imaging and, more particularly, to a method and apparatus of iterative image reconstruction for computed tomography.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction. Alternatively, x-ray detectors may use a direct conversion detector, such as a CZT detector, in lieu of a scintillator.

CT systems typically use analytical methods such as a filtered back-projection (FBP) method to reconstruct images from the acquired projection data. FBP methods of reconstruction are based on the Fourier Slice Theorem and provide means of reconstructing an image analytically from a single pass through the acquired projection data to invert the Radon transform. The typical ramp filter in standard FBP can be modified to improve the frequency response in some situations such as high resolution imaging. These analytical algorithms allow the full range of parameter choice in filter design. If one wishes to emphasize particular spatial frequencies in the reconstructed image, the full array of established filter design techniques is available to provide whatever suppression and emphasis of varying frequencies is desired.

Alternatively, an iterative technique may be used for reconstruction to improve image quality or reduce dose, or both. For example, model-based iterative reconstruction (MBIR) methods may be used to estimate an image based on pre-determined models of the CT system, the acquired projection data, and the reconstructed image such that the reconstructed image best fits the acquired projection data.

MBIR methods are typically based on the optimization of a cost functional, which is the sum of two terms:

$$\hat{x} = \arg\min_x \left\{ \sum_{m=0}^{M} D_m(y_m, F_m(x)) + S(x) \right\}, \quad \text{Eqn. (1)}$$

where $\hat{x}$ is the value of x that achieves the minimum summation, $y_m$ is an integral projection measurement, $F_m(x)$ is a forward projection function, $D_m(y_m, F_m(x))$ is a distance measure between $y_m$ and $F_m(x)$, and $S(x)$ is a regularizing or penalty function. The vector x is the discretized representation of a CT image. The first term in the brackets includes modeling of the geometry of the scanner and the statistics of the measurements. Minimizing this portion of the cost functional may be considered as an attempt to reconstruct the image that most closely matches the available measurements according to a statistical metric. The second term may be considered as a penalty function that assesses costs to any portion of the image containing traits which are considered undesirable. For example, large differences between neighboring voxels are usually considered improbable in realistic imagery and can be, therefore, discouraged by $S(x)$. MBIR reconstruction methods seek to balance the first and second terms.

In the Bayesian estimation framework, $S(x)$ can also be viewed as the a priori probability density of the image ensemble (in which case the minimization above becomes a maximization) or, more commonly, the negative logarithm of this density. Based on this description of $S(x)$, choosing the optimal image x includes weighting the choice by the probability that the given image would exist, independent of any measurements.

One class of a priori image models known in the art is the Markov random field (MRF). These models are characterized by the Gibbs' distribution, which expresses $S(x)$ as the summation of instances of a potential applied to collections of neighboring voxels. This formulation of the log a priori has been shown equivalent to a voxel being independent of the entire remainder of the image when conditioned on the values of all other voxels with which it shares cliques, i.e., the Markov property. A typical expression exploiting the Gibbs' formulation is:

$$S(x) = \sum_{\{i,j\} \in C} b_{i,j} \rho\left(\frac{x_i - x_j}{\sigma}\right), \quad \text{Eqn. (2)}$$

in which the potential $\rho(\bullet)$ is a non-negative, symmetric function, C is a clique of voxel pairs, and $b_{i,j}$ are directional weighting coefficients. In one example, cliques include voxel pairs which are nearest neighbors or are diagonally connected. Thus, a 3×3 matrix is typically used where the voxel, $x_i$, is in the center, and the voxels, $x_j$, surround the center voxel, $x_i$. MRF models employing the 3×3 matrix, however, restrict control over frequency behavior of the reconstruction operator, partly due to the limited spatial support of the regularization kernel, and do not allow full control over noise and resolution detail.

Therefore, it would be desirable to design a system and method of iterative image reconstruction that overcome the aforementioned drawbacks.

BRIEF DESCRIPTION OF THE INVENTION

In accordance with one aspect of the invention, a non-transitory computer readable storage medium having stored thereon a computer program having instructions, which, when executed by a computer, cause the computer to acquire a set of projection data corresponding to a plurality of image voxels and to calculate coefficients of a regularizing function configured to penalize differences between pairs of the plurality of voxels that are not immediate neighbors. The instructions also cause the computer to iteratively reconstruct an image from the set of projection data based on the regularizing function.

According to another aspect of the invention, a method of iterative image reconstruction includes acquiring a set of projection data corresponding to a plurality of image voxels and designing a regularizing function based on a spectral penalty model, the spectral penalty model comprising a Fourier transform of a spatial pattern of weights configured to penalize a difference between a central voxel of a pattern and another voxel of the pattern. The method also includes performing an iterative image reconstruction technique using the acquired set of projection data and based on the regularizing function to generate a final image.

According to yet another aspect of the invention, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system also includes a detector having pixels therein, the detector attached to the rotatable gantry and positioned to receive x-rays projected from the x-ray source and a computer. The computer is programmed to acquire a set of projection data corresponding to a plurality of voxels and to obtain a cost function configured to penalize differences between pairs of the plurality of voxels that are not immediate neighbors, wherein the cost function is spatially-invariant and comprises a negative penalty cost for at least one of the differences. The computer is also programmed to iteratively reconstruct an image from the set of projection data based on the cost function and to substitute a surrogate function for the negative penalty cost during the iterative reconstruction.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a sixty-four-slice computed tomography (CT) system. However, it will be appreciated by those skilled in the art that the invention is equally applicable for use with other single or multi-slice configurations. Moreover, the invention will be described with respect to the detection and conversion of x-rays. However, one skilled in the art will further appreciate that the invention is equally applicable for the detection and conversion of other high frequency electromagnetic energy. The invention will be described with respect to a "third generation" CT scanner, but is equally applicable with other CT systems.

Figure 1:
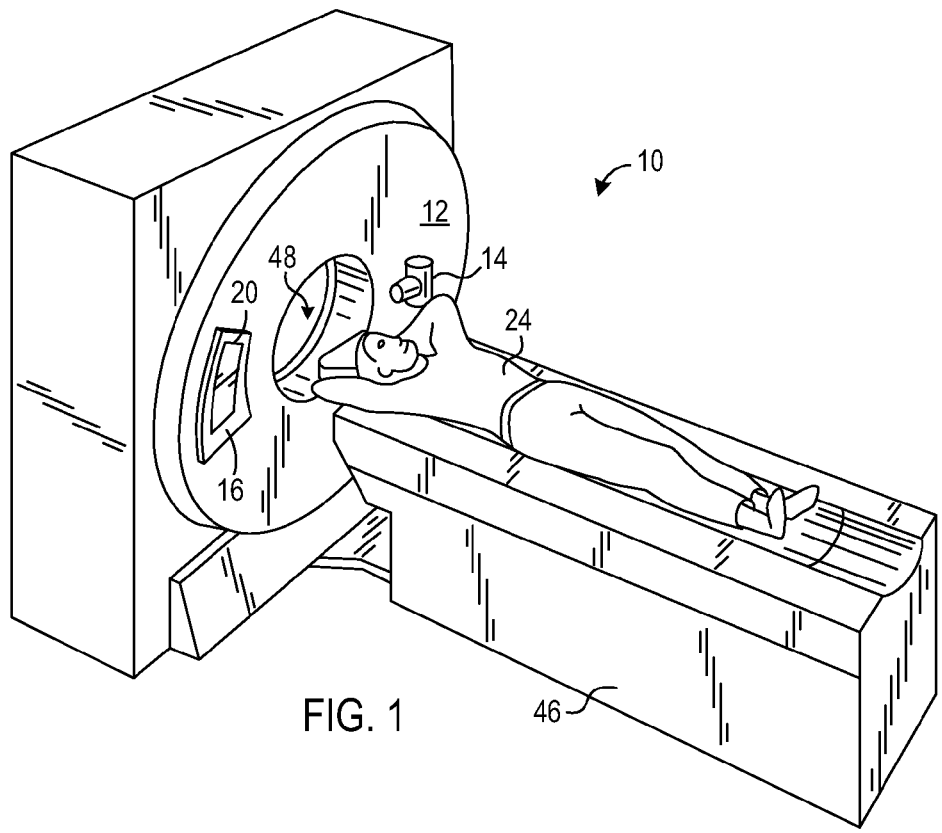
FIG. 1 is a pictorial view of a CT imaging system.
Figure 2:
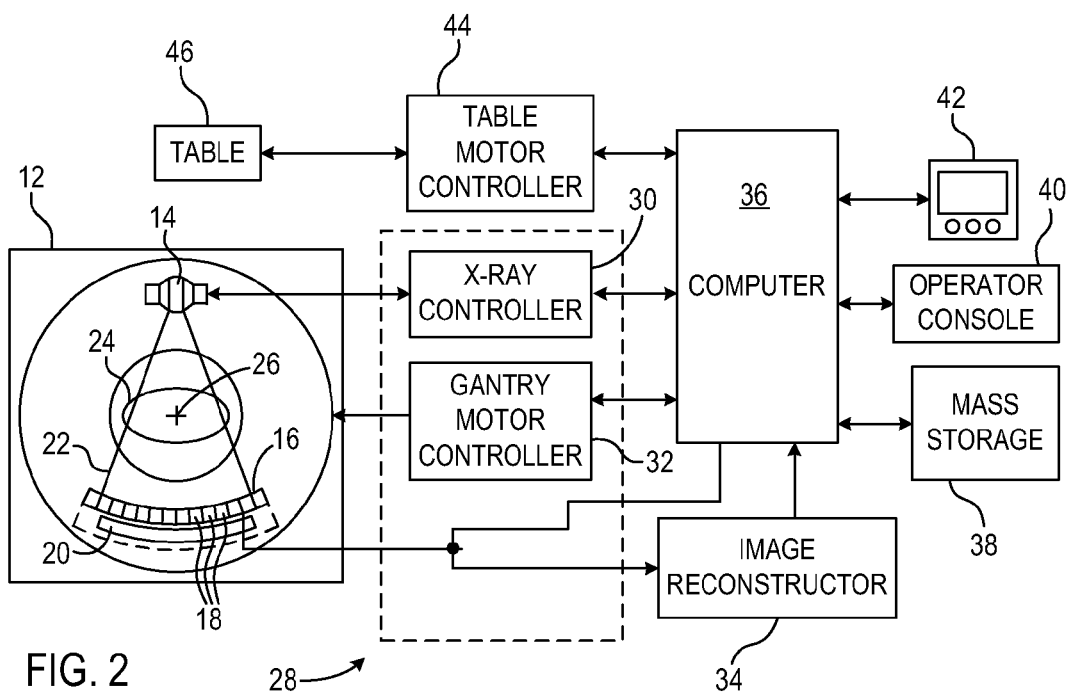
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
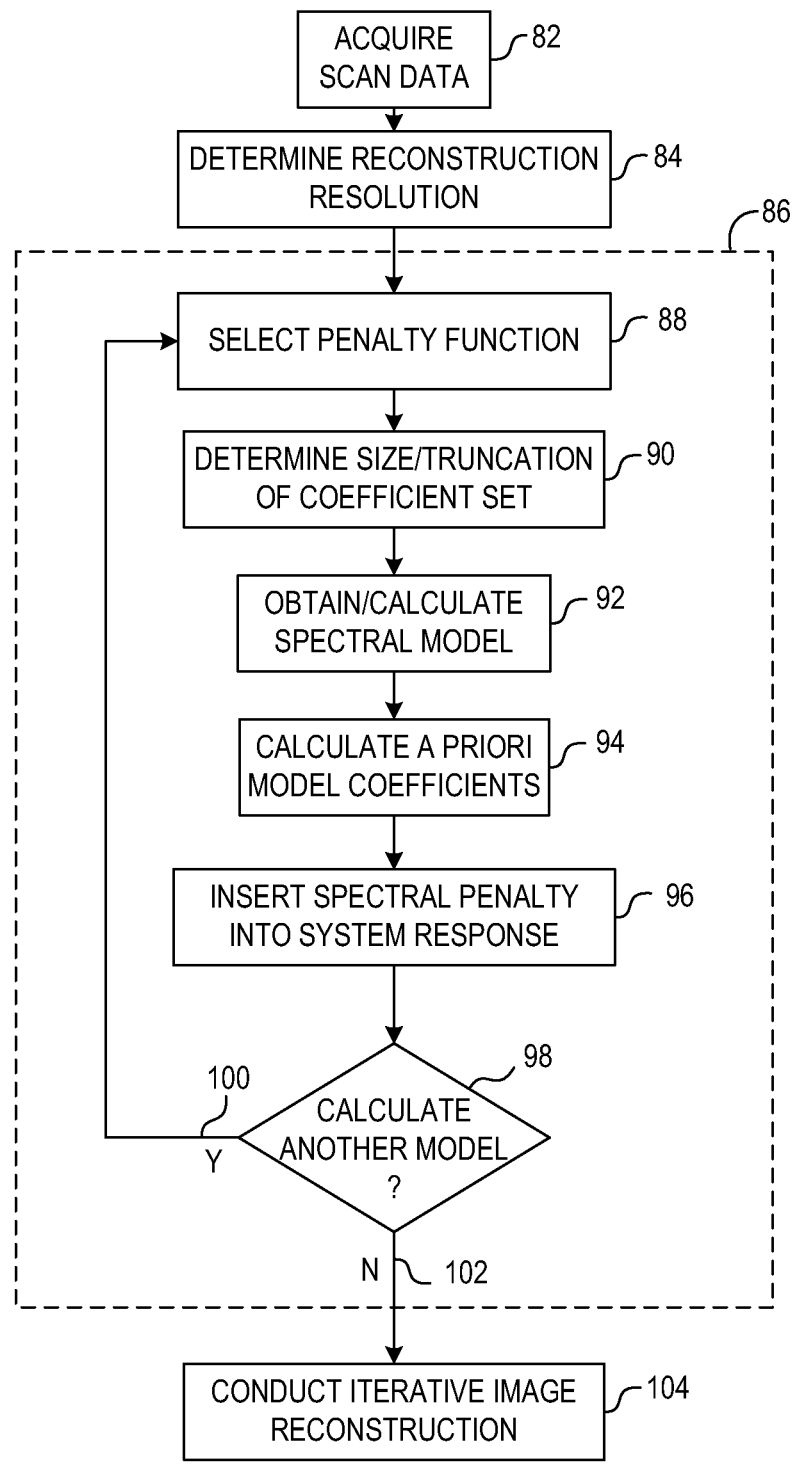
FIG. 3 is a flowchart illustrating a technique for reconstructing an image according to embodiments of the invention.

Referring now to FIG. 3, a model-based iterative reconstruction (MBIR) technique 80 is set forth according to an embodiment of the invention. Technique 80 begins by acquiring projection data at step 82. A determination is made, at step 84, of the resolution at which image reconstruction will be performed. A high resolution may be chosen to show finer details in the reconstructed image. The resolution determination may also be affected by a tradeoff between final image resolution and computational time.

When the voxels are reconstructed from acquired CT projection data, technique 80 uses higher-order models invoked to raise the number of degrees of freedom for spectral response, which opens the design of regularizers, or similarly, a priori image models, to Fourier-based spatial frequency response methods. Thus, weightings may be chosen that are equivalent to modeling high probability of the presence of strong components at particular spatial frequencies.

Accordingly, technique 80 implements a construction algorithm 86 to construct an a priori image model that may favor or inhibit various parts of the spatial frequency spectrum. In order to increase the number of degrees of freedom compared with conventional models, an MRF model is introduced having a penalization function, such as S(x) of Eqn. (2) above, of differences between a center voxel and other voxels beyond merely nearest neighbor voxels.

In a spatially-invariant model embodiment of the MRF, in one example, the values of the weighting coefficients do not depend on the values of both indices, but rather on the relative spatial positions of the two voxels. This is similar to the concept of a shift-invariant filter, and the application S(x) may be considered as a shift-invariant filtering with three stages in its evaluation at each point: 1) computation of the vector of differences between center voxel and each other voxel within the clique C window, 2) application of a non-negative function to each of the differences, and 3) computation of a linear combination of the results of the function in Eqn. (2) as the total penalty.

A Gaussian MRF has a negative log prior density in Eqn. (2), which may be expressed as:

$$S(x) = (\tfrac{1}{2}) x^T R x, \qquad \text{Eqn. (3)}$$

where the matrix R contains the weighting coefficients $\{b_{i,j}\}$ in its off-diagonal entries. R occupies the role of inverse covariance matrix in this model, and, making approximations of wide-sense stationarity of the images and appropriate handling of boundaries, the frequency-domain representation of the norm may be used, and analysis may be performed in terms of the spectrum of the penalty, $R(\omega)$. This view of the negative log prior expresses the behavior of the potential function as a weighting in the frequency domain.

The log a priori spectral content also has influence in image reconstruction. Given a CT sinogram data that may be modeled as a linear transformation of the image x plus noise (i.e., y=Ax+n, where A represents the forward projection operator), if a quadratic penalty for mismatch of data with the simulated forward projections is used, a special case of Eqn. (1) emerges:

$$\hat{x} = \arg\min_x \{(y - Ax)^T D(y - Ax) + x^T R x\}. \qquad \text{Eqn. (4)}$$

Solving for the optimal x results in:

$$\hat{x} = (A^T D A + R)^{-1} A^T D y, \qquad \text{Eqn. (5)}$$

and, if the response of the composite system of measurement followed by maximum a posteriori (MAP) reconstruction is considered, the signal component in the estimate is:

$$\hat{x} = (A^T D A + R)^{-1} A^T D A x. \qquad \text{Eqn. (6)}$$

Similarly to the previous formulation of the penalty function of the log a priori, the total response to the signal may be written as:

$$\hat{X}(\omega) = \frac{A_D(\omega)}{A_D(\omega) + R(\omega)} X(\omega), \qquad \text{Eqn. (7)}$$

with $A_D(\omega)$ the spectral version of the forward and backward projection kernel and with statistical weighting in the sinogram. This expression shows the bounds of potential manipulation of the spectral content of R. When $A_D(\omega)$ is formed ideally, with forward and backprojection as exact adjunct operators, it is non-negative definite, often approximated as having spatial frequency response in the (x,y) plane of $1/|\omega|$. Negative values in the spectral penalty $R(\omega)$ may, in practice, be tolerated or used to boost certain frequencies in the reconstruction. While this concept may be unconventional, as it assesses a negative penalty and, therefore, unbounded a priori density along some direction in the domain of x, the use of such improper a priori densities is sometimes used in Bayesian estimation. The a posteriori density of x may still be well-behaved.

The analysis above is relatively straightforward due to the quadratic penalties applied and consequent linear optimal estimates. In practice, non-quadratic, edge-preserving models may be better suited to realistic imagery, and convex but non-quadratic potentials will be common for ρ in Eqn. (2). Similar spatial frequency behavior will likely be observed in this case as well, and the spectral prior design may be extended to non-Gaussian priors such as the Generalized Gaussian MRF(GGMRF) and q-Generalized Gaussian MRF (qGGMRF) by simply inserting the $\{b_{i,j}\}$ from the quadratic design into Eqn. (2) with more general forms of ρ.

With a cost function having negative penalties for voxel differences in the prior, the total second derivative of S(x) may become negative, and in cases where the log a priori has a relatively large contribution to the total log a posteriori probability, the entire cost function of Eqn. (1) could be non-convex as a function of the voxel to be updated. An optimization method to ensure monotonic descent and to accelerate each voxel update includes the formation of a substitute function by replacing each function $\rho(x_i - x_j)$ with $f_{ij}(\cdot)$. For non-negative $\{b_{i,j}\}$, a quadratic substitute function may be used to upper bound the local 1D negative log a priori function.

For negative $\{b_{i,j}\}$, a local linear function may be used in place of the exact cost for voxel differences in the cost function to ensure the convexity of the substitute negative log prior. This can be expressed in the following surrogate function:

$$f_{ij}(u) = \begin{cases} \alpha_{ij} u^2 + \beta_{ij} u + \gamma_{ij}, & b_{ij} \geq 0 \\ \alpha_{ij} u + \beta_{ij}, & b_{ij} < 0 \end{cases}. \qquad \text{Eqn. (8)}$$

The coefficients $\alpha_{ij}, \beta_{ij}, \gamma_{ij}$ are chosen such that $f_{ij}(\cdot)$ and $\rho(x_i - x_j)$ are tangent to each other at $u = \tilde{x}_i$, where $\tilde{x}_i$ is the current state of the voxel whose value is to be optimized. This leads to the computation of $\alpha_{ij}$ as the following:

$$\alpha_{ij} = \begin{cases} \dfrac{\rho'(\Delta)}{2\Delta}, & b_{ij} \geq 0 \\ \rho'(\Delta), & b_{ij} < 0 \end{cases}, \qquad \text{Eqn. (9)}$$

where $\Delta = \tilde{x}_i - x_j$ and $\rho'(\cdot)$ is the derivative of the potential function $\rho(\cdot)$.

With the q-GGMRF prior and other potential functions, the computation of $\rho'(\cdot)$ can be time-consuming. For further optimization, the derivative of the prior may be linearized to allow pre-tabulation to increase the calculation speed. Before reconstruction starts, look-up tables of $\rho'(\Delta_k)$ and $\rho''(\Delta_k)$ are built at densely sampled locations $\Delta_k$. In this manner, first and second derivatives of the penalty costs are pre-computed and stored. Then, during reconstruction, for each computation of $\rho'(\Delta)$, the sample $\Delta_k$ that is closest to $\Delta$ is chosen, and the following linear approximation is used to compute $\rho'(\Delta)$:

$$\rho'(\Delta) = \rho'(\Delta_k) + \rho''(\Delta - \Delta_k). \qquad \text{Eqn. (10)}$$

For instance, a uniform sampling with 1 Hounsfield Unit (HU) step size may be used to build tables for range 0 to 5000

HU. The values for the samples closest to Δ can also be interpolated instead of using the nearest neighbor $\Delta_k$ directly.

Under clinical image review display windows, the reconstructed images from linear approximation show little or no visual difference from the original images without linear approximation. By using such linear approximation approach, the computational cost of the iterative update steps can be reduced by a significant amount, for example, 90%. The accuracy of the approximation may be increased by covering a larger range and using exponentially decreasing sampling intervals, which may better represent the actual distribution of neighboring voxel differences.

Referring again to technique 80, numerical iterative algorithm 86 includes selecting the type of penalty function, S(x), to be used during the iterative image reconstruction at step 88. The penalty function may be a quadratic or other non-negative, symmetric function. In addition, single voxel values are penalized by the penalty function. At step 90, the size or spatial truncation of the coefficient set $\{b_{i,j}\}$ of the penalty function is determined. In this manner, the size of the neighborhood around each voxel for the clique C is determined. For example, a 7×7 neighborhood or an 11×11 neighborhood may be chosen, which are larger than the conventional 3×3 Markov Random Field models. These neighborhoods, however, are merely exemplary, and embodiments of the invention include any sized neighborhood larger than a 3×3 neighborhood.

Figure 4:
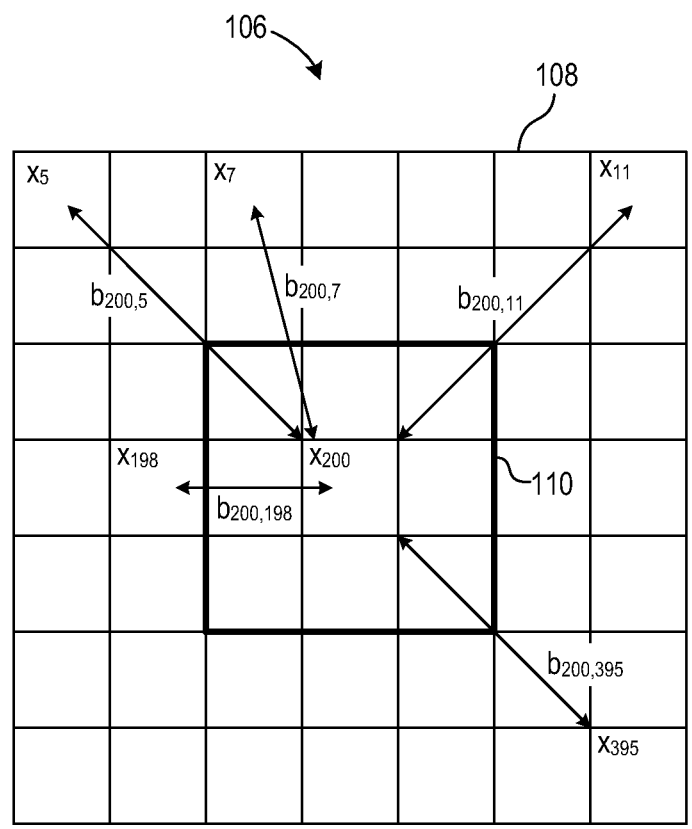
FIG. 4 is a plot illustrating a voxel neighborhood according to an embodiment of the invention.

Referring to FIG. 4, a plot 106 is shown of a voxel neighborhood 108 for reconstruction according to an embodiment of the invention. Neighborhood 108 is shown as a 7×7 window of voxels extracted in two dimensions from an image of larger dimensions, such as 64×64. As explained above, embodiments of the invention contemplate that neighborhoods larger than 3×3 in any dimension may be used. In addition, one skilled in the art would recognize that extending from two dimensions to three-dimensional or higher dimensional reconstructions is a straightforward process. A 3×3 box 110 at the center of the figure indicates the extent of the neighborhood of the penalty that is applied in conventional MRF models in Bayesian estimation in inverse problems. Such neighborhoods typically involve only relative values of voxels that are immediate neighbors horizontally, vertically or diagonally.

The voxels are indexed in increasing order left-to-right, and top-to-bottom, which increases the index by 64 between rows. Each arrow, indicating the differencing of two respective voxels, is accompanied by a "b" coefficient from Eqn. (2) that weights the output of the function ρ applied to the corresponding difference relative to the 200th voxel in evaluating S(x). As shown, differences between voxel pairs that are immediate neighbors are penalized (such as between voxel x200 and the other voxels inside box 110) as well as differences between voxel pairs that are not immediate neighbors (such as between voxel x200 and the other voxels outside box 110).

Referring again to FIG. 3, at step 92, a spectral model is obtained that relates to the objects or features expected in the final reconstructed image. In one embodiment, the spectral model is selected from a priori spectral models generated based on empirical evidence of known samples of tissues or materials in sample images. These models may be generated using classical spectral estimation techniques typically in 2 or 3 dimensions. The spectral models may each correspond to the spectra associated with tissues of interest such as bone, water, mixed tissues, or the like. In this step, for example, an a priori spectral model of bone tissue may be chosen based on an expectation of the appearance of bone in the final image to be reconstructed. The existence or expectation of a certain type of tissue in the final image to be reconstructed may come from a priori knowledge of the scanned region or from an analysis of the scanned data. The spectral model may be obtained from storage (such as from a disk) in its direct usable form, or it may be obtained and modified to match the neighborhood size and sampling rate.

In another embodiment, the spectral model may be generated based on a desire to emphasize some frequencies and to penalize other frequencies. Accordingly, a 1D spectral design may be generated based on the type of frequency response desired. For example, it may be determined based on the showing of a particular type of texture in the region of interest that a strong spectral component with frequency 50% of Nyquist along each axis is expected. A system signal response to the 1D spectral design may be generated and analyzed to determine the desirability of the response. If the system signal response is undesirable, one or more iterations of modifying the 1D spectral design and analyzing its system signal response may be performed until a desirable response is found. Modification of the 1D spectral design may include, for example, changing a size of the neighborhood or changing the desired frequencies for emphasis or penalization. The 1D spectral design may then be expanded into a 2D or 3D spectral model using, for example, a McClellan transform.

At step 94, the spectral model is used to generate the spatial coefficients $\{b_{i,j}\}$ of the penalty function of the a priori model at the reconstruction resolution determined at step 84. The coefficients may be generated, for example, through Fourier transform methods or through re-sampling of autocorrelation estimates of the spectral model.

In another embodiment, using sample images of materials to be reconstructed similarly to paragraph 0045, we may choose the set of coefficients by (1) choosing the size of neighborhood to be used in the a priori model at reconstruction, and 2) computing the coefficients as those weights that minimize the norm of total prediction error across the sample images. This error is defined as follows. For every set of surrounding neighbors of the i-th voxel and set of weights in the model of Eqn. (2), there is a value for voxel i which minimizes the sum of the components of S(x) including voxel i. This value is called the "prediction" of voxel i, given its neighbors. The normed error is the sum, across the entire sample image set, of the squared values (or other total norm, such as total absolute error) of the differences between all predicted values and their actual values in the images. This prediction error norm will vary with the selection of the coefficients, and the coefficients by may be chosen by minimizing this total prediction error, as expressed below for least-squares fitting:

$$b_{LS} = \arg\min_b \sum_i (x_i - \hat{x}_i(x_{j \neq i}, b))^2. \qquad \text{Eqn. (11)}$$

This approach has an advantage in being directly applicable to non-Gaussian image models featuring nonlinear prediction.

At step 96 the resulting spectral penalty (R(ω)) from the previous steps may be inserted or input into the system signal response to get the total response to image content if desired. If the resulting system response is a different response than what is desired, filter design techniques may be used to modify R(ω) as desired. The filter design techniques may include, in one embodiment, a modification to a 1D spectral penalty design followed by a McClellan transform as described above. The modified R(ω) may then be inverted to get modified coefficients of the log a priori distribution.

At step 98, technique 80 determines whether another a priori image model should be constructed. For an image containing more than one tissue type of interest, multiple spectral models may be desired to be applied during the image reconstruction to address the various tissues. If another a priori image model is to be constructed 100, then technique 80 returns to step 88 of numerical iterative algorithm 86, and process control follows as described above.

If no more a priori image models are to be constructed 102, then at step 104, an iterative image reconstruction of the scan data acquired at step 82 is performed using the one or more a priori image models in an optimization or minimization of the cost function such as that found in Eqn. (1) or Eqn. (4), for example. The iterative image reconstruction may include determining the regions of spatial invariance over which each a priori model should be applied. The regions may be determined, for example, by performing a filtered back-projection of the acquired data to generate a first image and then segmenting the regions in the first image. The regions may also be updated iteratively during the reconstruction process based on current estimates of the reconstructed objects.

Figure 5:
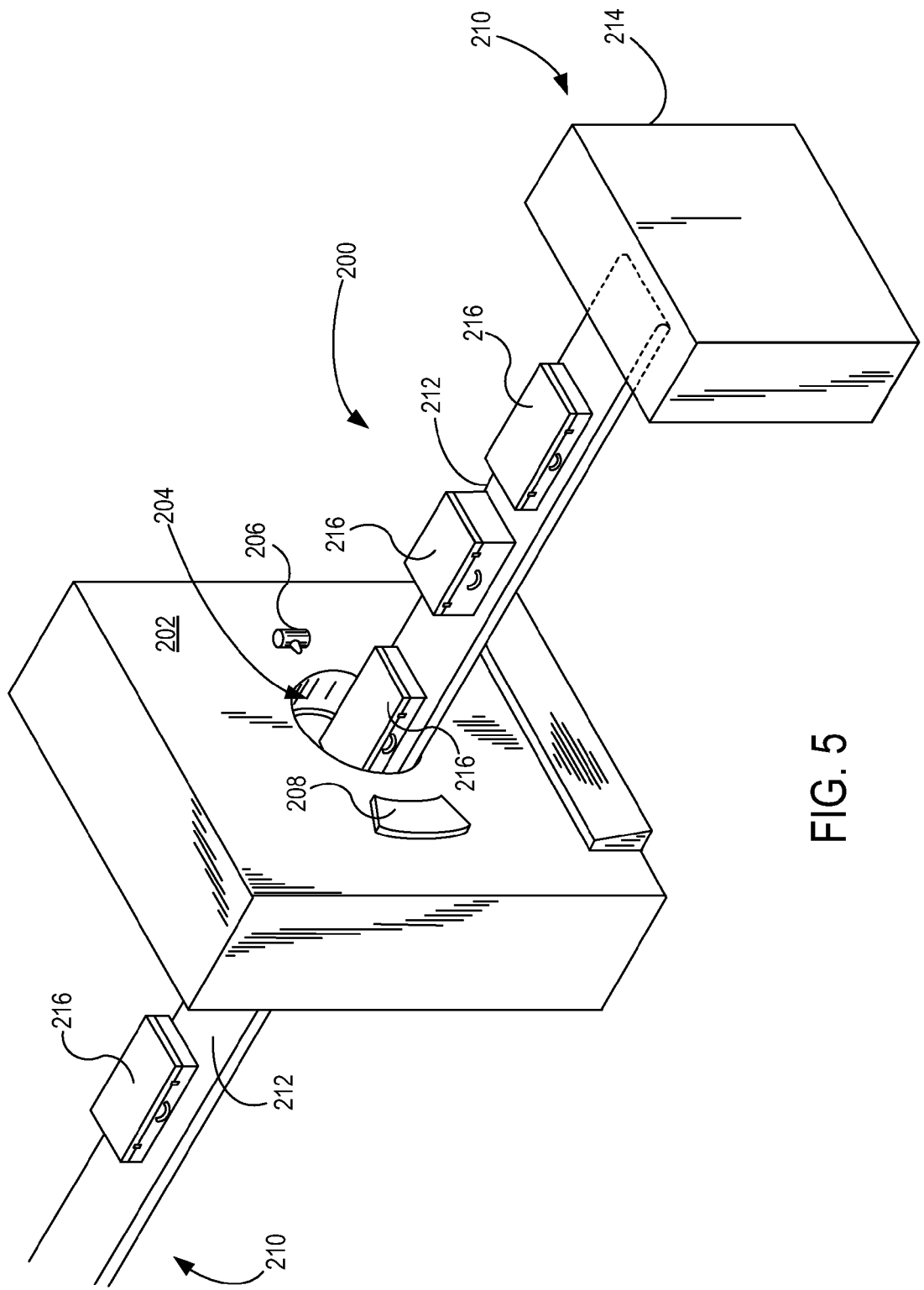
FIG. 5 is a pictorial view of a CT system for use with a non-invasive package inspection system.

Referring now to FIG. 5, package/baggage inspection system 200 includes a rotatable gantry 202 having an opening 204 therein through which packages or pieces of baggage may pass. The rotatable gantry 202 houses a high frequency electromagnetic energy source 206 as well as a detector assembly 208 having scintillator arrays of scintillator cells or having direct conversion arrays of direct conversion cells. A conveyor system 210 is also provided and includes a conveyor belt 212 supported by structure 214 to automatically and continuously pass packages or baggage pieces 216 through opening 204 to be scanned. Objects 216 are fed through opening 204 by conveyor belt 212, imaging data is then acquired, and the conveyor belt 212 removes the packages 216 from opening 204 in a controlled and continuous manner. As a result, postal inspectors, baggage handlers, and other security personnel may non-invasively inspect the contents of packages 216 for explosives, knives, guns, contraband, etc.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

A technical contribution for the disclosed method and apparatus is that it provides for a computer implemented method of iterative image reconstruction for computed tomography.

Therefore, according to an embodiment of the invention, a non-transitory computer readable storage medium having stored thereon a computer program having instructions, which, when executed by a computer, cause the computer to acquire a set of projection data corresponding to a plurality of image voxels and to calculate coefficients of a regularizing function configured to penalize differences between pairs of the plurality of voxels that are not immediate neighbors. The instructions also cause the computer to iteratively reconstruct an image from the set of projection data based on the regularizing function.

According to another embodiment of the invention, a method of iterative image reconstruction includes acquiring a set of projection data corresponding to a plurality of image voxels and designing a regularizing function based on a spectral penalty model, the spectral penalty model comprising a Fourier transform of a spatial pattern of weights configured to penalize a difference between a central voxel of a pattern and another voxel of the pattern. The method also includes performing an iterative image reconstruction technique using the acquired set of projection data and based on the regularizing function to generate a final image.

According to yet another embodiment of the invention, an imaging system includes a rotatable gantry having an opening for receiving an object to be scanned, an x-ray source coupled to the rotatable gantry and configured to project x-rays through the opening, and a generator configured to energize the x-ray source to an energy level to generate x-rays corresponding to the energy level. The imaging system also includes a detector having pixels therein, the detector attached to the rotatable gantry and positioned to receive x-rays projected from the x-ray source and a computer. The computer is programmed to acquire a set of projection data corresponding to a plurality of voxels and to obtain a cost function configured to penalize differences between pairs of the plurality of voxels that are not immediate neighbors, wherein the cost function is spatially-invariant and comprises a negative penalty cost for at least one of the differences. The computer is also programmed to iteratively reconstruct an image from the set of projection data based on the cost function and to substitute a surrogate function for the negative penalty cost during the iterative reconstruction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable storage medium having stored thereon a computer program comprising instructions, which, when executed by a computer, cause the computer to:
acquire a set of projection data corresponding to a plurality of image voxels;
calculate coefficients of a regularizing function configured to penalize differences between pairs of the plurality of voxels that are not immediate neighbors; and
iteratively reconstruct an image from the set of projection data based on the regularizing function.

2. The computer readable storage medium of claim 1 wherein the coefficients correspond with a spatial pattern of weights configured to penalize the differences;
wherein the differences comprise differences of each of a plurality of voxels in a pattern from a central voxel of the pattern; and
wherein the instructions cause the computer to generate the spatial pattern of weights from a Fourier transform of a spectral penalty model.

3. The computer readable storage medium of claim 1 wherein the regularizing function comprises a spatially-invariant regularizing function.

4. The computer readable storage medium of claim 1 wherein the regularizing function is further configured to penalize differences between pairs of the plurality of voxels that are immediate neighbors.

5. The computer readable storage medium of claim 1 wherein the regularizing function comprises a quadratic penalty function.

6. The computer readable storage medium of claim 1 wherein the regularizing function comprises a penalty function having an independent variable; and
wherein a magnitude of a second derivative of the penalty function is a decreasing function of a magnitude of the independent variable.

7. The computer readable storage medium of claim 1 wherein the regularizing function comprises at least one negative coefficient.

8. The computer readable storage medium of claim 7 wherein the instructions cause the computer to substitute a surrogate function in place of a cost for voxel differences in the regularizing function for the at least one negative coefficient.

9. The computer readable storage medium of claim 1 wherein the regularizing function is further configured to penalize single voxel values.

10. The computer readable storage medium of claim 1 wherein the regularizing function is further configured to apply a negative penalization to at least one of the differences between pairs of the plurality of voxels.

11. The computer readable storage medium of claim 1 wherein the instructions cause the computer to:
obtain a spectral model of a first tissue type; and
generate the coefficients of the regularizing function based on the spectral model.

12. The computer readable storage medium of claim 11 wherein the instructions cause the computer to generate the coefficients of the regularizing function via one of a Fourier transform method and a re-sampling of autocorrelation estimates of the spectral model.

13. The computer readable storage medium of claim 11 wherein the instructions cause the computer to obtain the spectral model from a plurality of a priori spectral models generated based on empirical evidence of known samples of the first tissue type.

14. The computer readable storage medium of claim 11 wherein the instructions cause the computer to transform a spectral model having a single dimension into a spectral model having at least two dimensions to obtain the spectral model of the first tissue type, the spectral model having a single dimension based on a type of frequency response desired.

15. The computer readable storage medium of claim 1 wherein the instructions cause the computer to generate the coefficients of the regularizing function via calculation of a set of weights that minimize a norm of total prediction error across a sample image.

16. A method of iterative image reconstruction comprising:
acquiring a set of projection data corresponding to a plurality of image voxels;
designing a regularizing function based on a spectral penalty model, the spectral penalty model comprising a Fourier transform of a spatial pattern of weights configured to penalize a difference between a central voxel of a pattern and another voxel of the pattern; and
performing an iterative image reconstruction technique using the acquired set of projection data and based on the regularizing function to generate a final image.

17. The method of claim 16 wherein designing the regularization function comprises performing the Fourier transform of the spectral penalty model to generate coefficients for the regularization function; and
wherein the central voxel and the another voxel are not immediate neighbors in the pattern.

18. The method of claim 16 further comprising assigning a value to each of a plurality of sample points in the spectral penalty model.

19. The method of claim 18 further comprising assigning a value of zero to a sample point corresponding with a zero spatial frequency.

20. The method of claim 16 wherein the spectral penalty model is rotationally invariant among at least two spatial frequency variables.

21. The method of claim 16 wherein the spatial pattern of weights comprises a negative penalty corresponding with a respective spatial frequency.

22. An imaging system comprising:
a rotatable gantry having an opening for receiving an object to be scanned;
an x-ray source coupled to the rotatable gantry and configured to project x-rays through the opening;
a generator configured to energize the x-ray source to an energy level to generate x-rays corresponding to the energy level;
a detector having pixels therein, the detector attached to the rotatable gantry and positioned to receive x-rays projected from the x-ray source; and
a computer programmed to:
acquire a set of projection data corresponding to a plurality of voxels;
obtain a cost function configured to penalize differences between pairs of the plurality of voxels that are not immediate neighbors, wherein the cost function is spatially-invariant and comprises a negative penalty cost for at least one of the differences;
iteratively reconstruct an image from the set of projection data based on the cost function; and
substitute a surrogate function for the negative penalty cost during the iterative reconstruction.

23. The system of claim 22 wherein the computer, in being programmed to substitute the surrogate function, is programmed to substitute a local linear function for the negative penalty cost during the iterative reconstruction.

24. The system of claim 22 wherein the cost function comprises a positive penalty cost for at least one of the differences; and
   wherein the computer is further programmed to substitute a local quadratic function for the positive penalty cost during the iterative reconstruction.

25. The system of claim 22 wherein the computer, in being programmed to substitute the surrogate function, is programmed to pre-compute and store the values of a first and second derivative of the penalty cost for at least one of the differences.

* * * * *